March 29, 1927.
F. A. REISS
1,622,674
HANDLE FOR SHIPPING BASKETS
Filed May 10, 1926
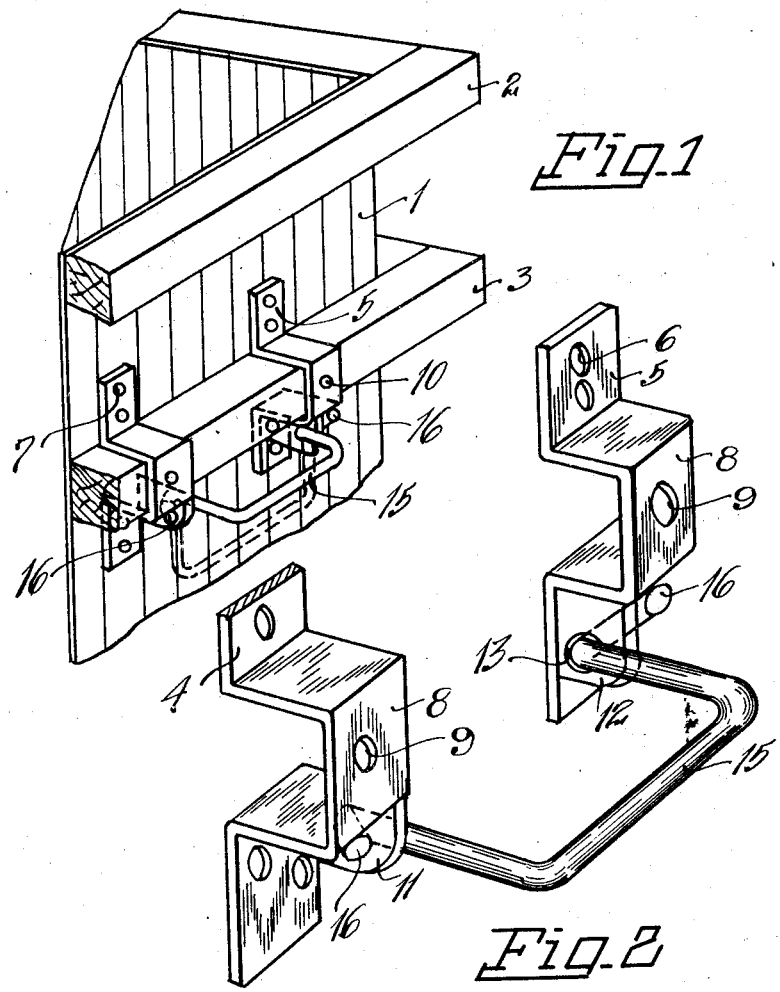
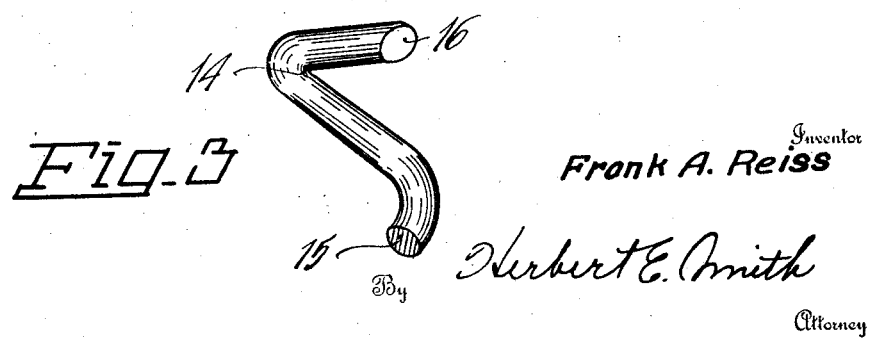
Inventor
Frank A. Reiss
By Herbert E. Smith
Attorney Patented Mar. 29, 1927.

1,622,674

UNITED STATES PATENT OFFICE.

FRANK A. REISS, OF MEDIMONT, IDAHO.

HANDLE FOR SHIPPING BASKETS.

Application filed May 10, 1926. Serial No. 108,117.

My present invention relates to improvements in handles for shipping baskets or crates for bread and similar commodities, and particularly to the handle structure of such receptacles. As is well known in bakery trade, bread and other products of the bakery are shipped by railway express and other means from the central shipping point to the distributing places, and for the purpose of economizing in shipping charges, the baskets or carriers are usually fashioned of light-weight structures that are frequently fragile and not well suited as supports for the handles required in handling the boxes, baskets, or crates.

The handles now in use are of such nature and are attached to and anchored on the exterior of the body of the basket in such manner as to readily tear or break away from the basket under hard usage or usual wear and tear, thus causing an expensive upkeep or maintenance for repairs and replacements, and reducing the efficiency in handling the baskets or crates.

The primary object of my invention is the provision of handle structures for the basket which are simple in construction, comprise a minimum number of parts and therefore are inexpensive in cost of production, and which not only perform their usual functions but which reinforce and strengthen the the body structure of the baskets upon which they are used.

The invention consists in certain novel combinations and arrangements of parts in the basket structure and handle supports as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a perspective view showing a portion of a bread basket or shipping crate with one of the handle structures attached thereto, and showing by dotted lines the handle in inoperative position.

Figure 2 is a perspective view of a handle of the swinging loop type and its supports, detached.

Figure 3 is an enlarged detail perspective view of a portion of the swinging loop of the handle.

A pair of handles are generally used at opposite sides of the basket or crate, which latter, as shown in Figure 1 is fashioned of vertical slats 1 forming its side walls, and several horizontally disposed, exterior cleats, spaced apart as required are used to reinforce the structure. Of these cleats the top one is indicated as 2 and an intermediate cleat is indicated at 3 in Figure 1, these cleats it being understood extend around the sides of the basket and are attached to the body of the basket in suitable manner.

The cleats are preferably of wood and rectangular in cross section, and the intermediate cleat 3 is utilized by me in attaching the handle structures to the basket.

Each handle is provided with a pair of supports in the form of metallic anchoring straps 4 and 5 disposed vertically at the outer side of the basket and provided with holes as 6 for screws, nails or other fastening means indicated at 7 for attachment to the body of the basket.

The attaching straps are fashioned with reinforcing, angular, offset, intermediate, bow-plates 8 which conform to the shape of the cleat 3 and fit closely and neatly over said cleat. These bow-plates also have holes 9 therein for screws or nails 10 used to fasten the straps to the cleat. The straps with their bow-plates thus form reinforcing joint-braces between the cleat and body of the basket in addition to providing stable supports for the handles which are fashioned as swinging loops.

The complementary supporting straps 4 and 5 are each formed with an integral flange or outwardly extending ear as 11 and 12 depending at the inner sides of the straps from the bow-plates and provided with alined holes or openings 13. The openings are for the reception and retention of journal-bends 14 at the ends of the handle-loop 15, and the extremities 16 of the handles are passed through these apertures or holes before the straps are attached to the basket. The extremities 16 of the handle-loop are bent at an angle to the loop in order that when the handle is raised to operative position as shown in full lines Figure 1 and in Figure 2, these ends 16 will abut against the under sides of the bow-plates to stop the handle and receive the strain of the weight of the contents of the basket when the latter is lifted.

When not in use the handles are free to swing and fall by gravity to dotted position of Figure 1 where they lie against the basket below the cleat, and the stop-ends 16 of the handle are below the bow-plates. The bow-plates project over the stop-ends and thus shield them against contact with objects and the handles thus protected permit close arrangement of a number of baskets or crates.

The handle supports thus reinforce and brace the basket structure against undue wear and tear, provide a stable support for the handles when in use, and shield the handles when not in use.

Having thus fully described my invention, what I claim as new and desire to secure by Letters Patent is—

The combination with a basket having an exterior cleat, of spaced attaching straps, bow plates integral with said straps, perforated ears integral with the respective straps and plates and located below the cleat, a swinging loop handle supported in said ears, and angular stop-ends on said loop for co-action with said bow plates.

In testimony whereof I affix my signature.

FRANK A. REISS.